United States Patent [19]
Breeden

[11] Patent Number: 5,150,110
[45] Date of Patent: Sep. 22, 1992

[54] SELECTIVE CALL COMMUNICATION SYSTEM WITH REMOTELY GENERATED REPEAT MESSAGES

[75] Inventor: Robert L. Breeden, Boynton Raton, Fla.

[73] Assignee: Motorola, Inc., Schaumburg, Ill.

[21] Appl. No.: 564,501

[22] Filed: Jul. 27, 1990

[51] Int. Cl.⁵ .............................................. H04Q 7/00
[52] U.S. Cl. .................................. 340/825.44; 371/32
[58] Field of Search ...................... 340/825.44, 825.48; 371/69.1, 33, 32; 379/56, 57; 178/4.1 C; 455/38, 56

[56] References Cited
U.S. PATENT DOCUMENTS 4,646,082  2/1987  Engel et al. ...................... 340/825.44
4,908,828  3/1990  Tikalsky .............................. 371/69.1

*Primary Examiner*—Donald J. Yusko
*Assistant Examiner*—Edwin C. Holloway, III
*Attorney, Agent, or Firm*—Gregg E. Rasor; Daniel R. Collopy; Vincent B. Ingrassia

[57] ABSTRACT

A selective call communication system (300), operates to transmit an information signal (501) from a message origination site (305) to a plurality of transmitting sites (310, 311, 312). The transmitting sites (310, 311, 312), in turn, transmit and re-transmit the information signal (504) received from the message origination site (305).

15 Claims, 5 Drawing Sheets

SELECTIVE CALL COMMUNICATION SYSTEM WITH REMOTELY GENERATED REPEAT MESSAGES

FIELD OF THE INVENTION

This invention relates generally to selective call communication systems, and more particularly to those selective call communication systems that operate to repeat messages to insure message reception.

BACKGROUND OF THE INVENTION

Contemporary selective call (e.g. paging) communication systems are known to repeatedly transmit a message from a centralized location to a plurality of remote transmitting site located throughout a geographic area. The remote transmitting sites, in turn, transmit the message into their respective broadcast coverage areas via known techniques. This practice has an advantage in that selective call receivers (e.g., pagers) operating within the selective call communication system are less likely to miss a message when more that one reception opportunity is provided.

Regrettably, as more and more individuals operate their pagers on contemporary selective call communication systems, message throughput tends to be adversely affected. Moreover, the above-described practice of sending repeat messages from the central site aggravates the throughput problem, further reducing communication efficiency. To solve this problem, some system designers have contemplated increasing the information rate between the central site and the plurality of remote transmitting sites. While facially attractive, this alternative places stringent performance specifications on the communication media employed between the central site and the remote transmitting sites. In the past, leased telephone lines have been used as the central-remote communication link, however, it would likely become necessary to install a dedicated communication channel capable of accommodating high (9600 Baud or higher) data rates. Naturally, the use of such a communication channel between the central site and each of the plurality of remote sites would increase the cost of the communication system both from an initial cost basis and from a continuing maintenance cost perspective. Accordingly, manufacturers of selective call communication systems are continually searching for techniques to reduce message throughput impediments and increase communication efficiency while still providing the reliability of affording receivers operating within their communication systems several opportunities to receive a message.

SUMMARY OF THE INVENTION

Briefly, according to the invention, a selective call communication system, operates to transmit an information signal from a message origination site to a plurality of transmitting sites. The transmitting sites, in turn, transmit and re-transmit the information signal received from the message origination site.

DESCRIPTION OF A PREFERRED EMBODIMENT

Figure 1:
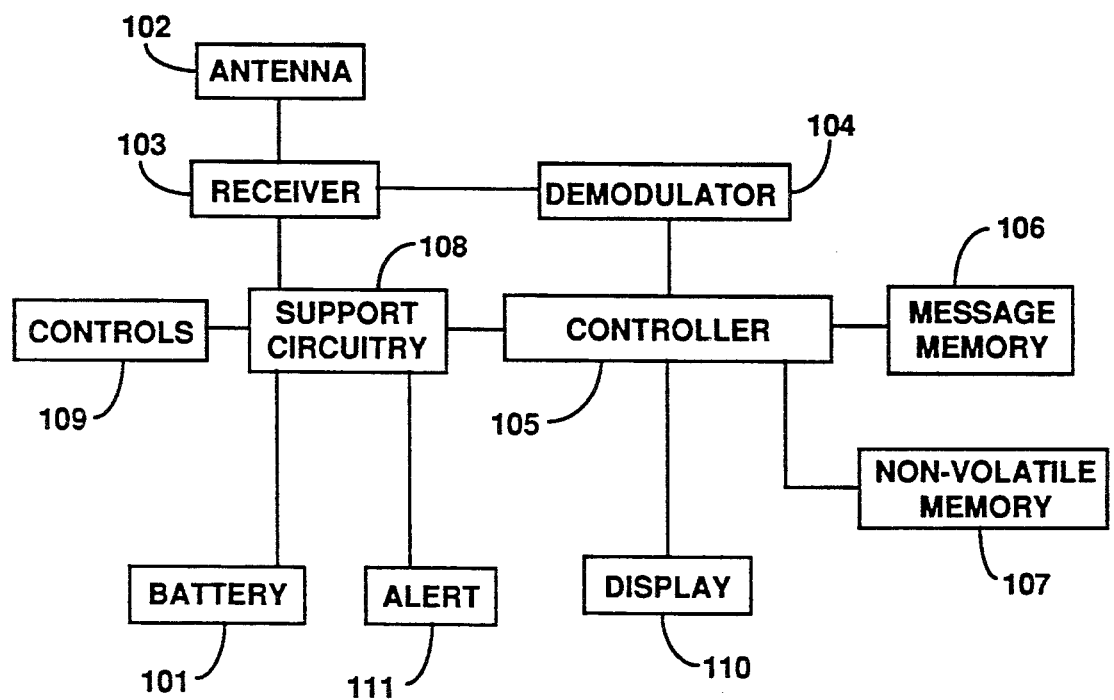
FIG. 1 is a block diagram of a selective call information receiver.

Referring to FIG. 1, a battery (101) powered selective call receiver operates to receive a signal via an antenna 102. The received signal is routed from the antenna 102 to a receiver 103. The receiver 103 couples a received signal to a demodulator 104, which recovers any information present using conventional techniques. The recovered information is coupled to a controller 105 that interprets and decodes the recovered information. In the preferred embodiment, the controller 105 comprises a microprocessor having a signal processor (decoder) implemented in both hardware and software.

The recovered information is checked by the decoder, which implements the signal processor that correlates a recovered address with a predetermined address stored in the selective call receiver's (100) non-volatile memory 107. The non-volatile memory 107 typically has a plurality of registers for storing a plurality of configuration words that characterize the operation of the selective call receiver. In determining the selection of the selective call receiver, a correlation is performed between a predetermined address associated with the selective call receiver and a received address. When the addresses correlate, the controller 105 couples message information to the message memory 106. In accordance with the recovered information, and settings associated with the user controls (109), the selective call receiver presents at least a portion of the message information, such as by a display 110, and signals the user via an audible or tactile alert 111 that a message has been received. The user may view the information presented on the display 110 by activating the appropriate controls (109).

The support circuitry 108 preferably comprises a conventional signal multiplexing integrated circuit, a voltage regulator and control mechanism, environmental sensing circuitry such as for light or temperature conditions, audio power amplifier circuitry, control interface circuitry, and display illumination circuitry. These elements are arranged in a known manner to provide the display information receiver as requested by the customer.

Figure 2:
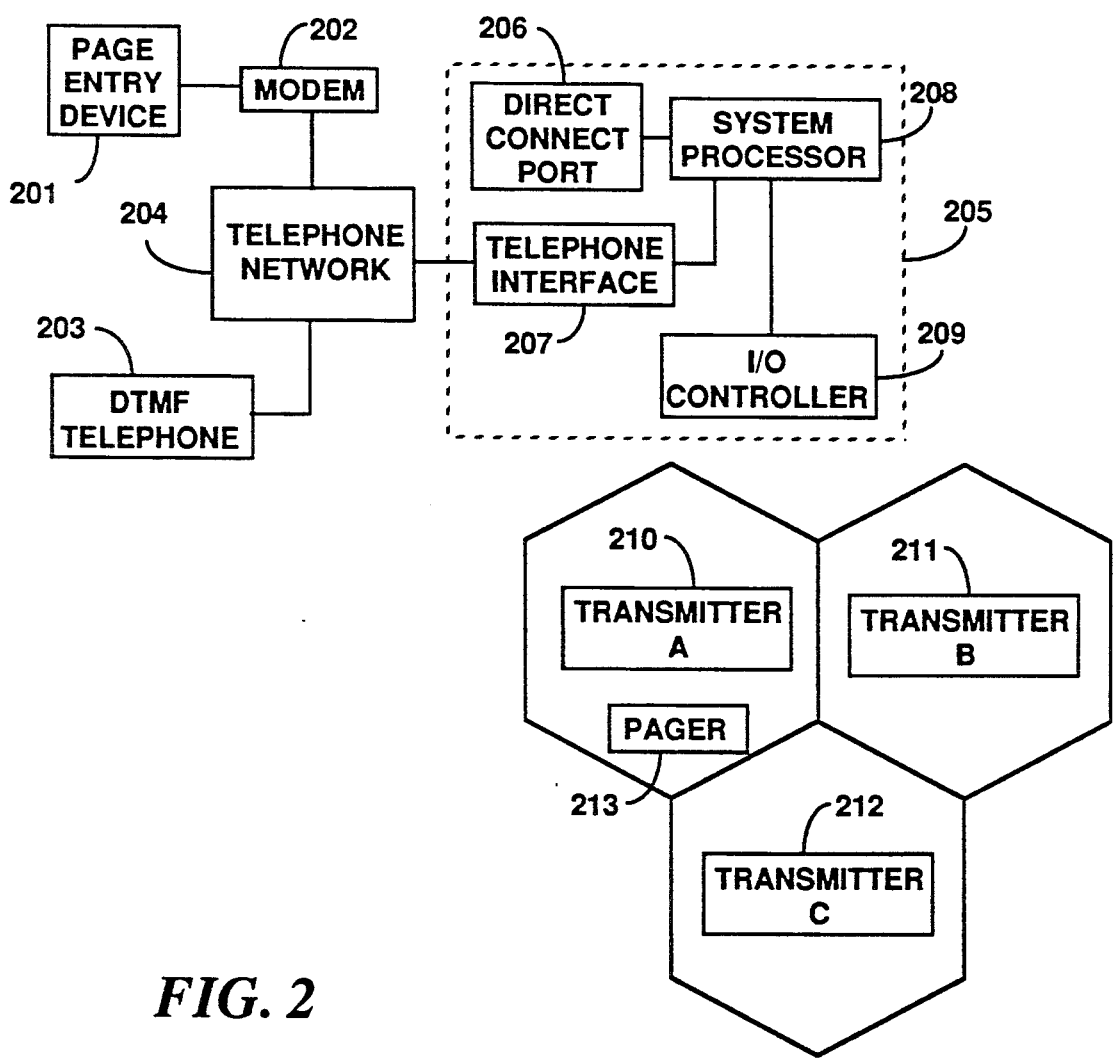
FIG. 2 is a block diagram of a selective call information signalling system.

Referring to FIG. 2, the selective call information signalling system uses a page entry device 201 (a microcomputer or application specific entry device) via a modem 202 or DTMF (dual-tone multi-frequency) telephone 203, to access a selective call information signalling system terminal (paging terminal) 205 via any public or private telephone network 204. The paging terminal 205 comprises a direct connect port 206, telephone interface 207, system processor 208, and I/0 controller 209. The direct connect port 206 is used to provide high speed, full duplex communications to the system processor 208, thus providing a user with the capability of remotely controlling the operation of the paging terminal 205.

Referring still to FIG. 2, transmitters A (210), B (211), and C (212) are controlled by the paging terminal 205 through, for example, dedicated phone lines or radio frequency links coupled to the I/0 controller 209. The I/0 controller 209 serves to multiplex the control and data channels required for the transmission of encoded data from the paging terminal 205 to local or remote transmitter sites.

When signalling a selective call receiver (pager) 213 using the system in FIG. 2, a user accesses the paging terminal 205 via the page entry device 201 or a conventional DTMF telephone 203. The user's input is relayed through the telephone network 204 to the paging terminal 205. The paging terminal controls access to the programming system as well as processing the user supplied data to create a message that is subsequently transmitted to the pager 213. Upon receipt of the programming message, the pager will present the message content as determined by the paging mode selected and the information contained in the message.

Figure 3:
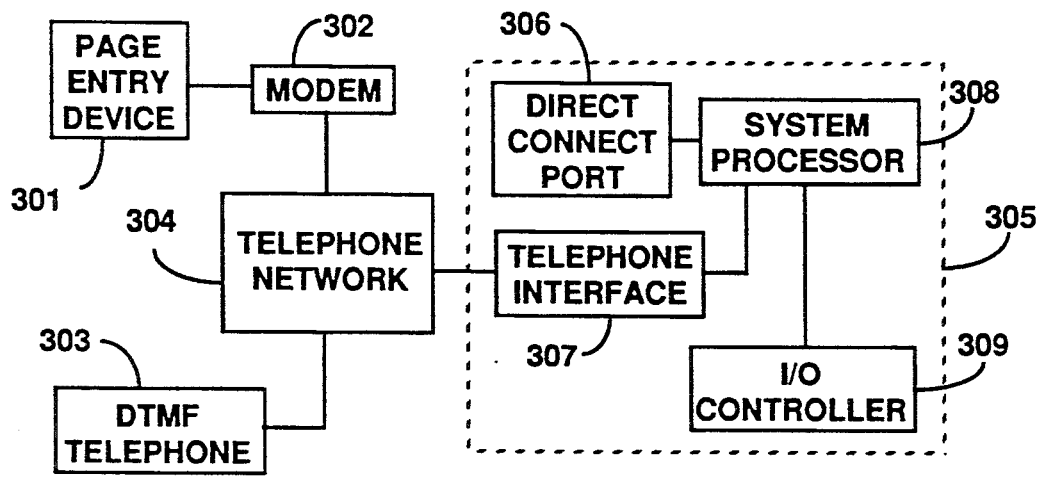
FIG. 3 is a block diagram of a selective call information signalling system in accordance with the present invention.
Figure 3:
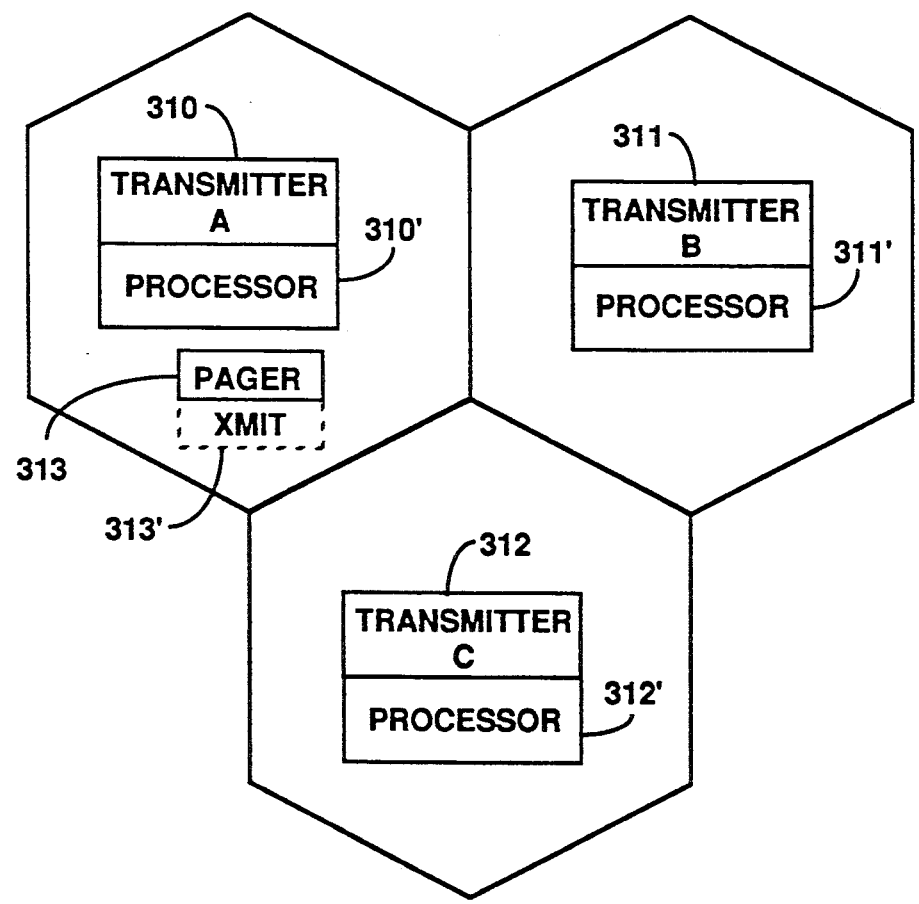

Referring to FIG. 3, the selective call information signalling system uses a page entry device 301 (a microcomputer or application specific entry device) via a modem 302 or DTMF (dual-tone multi-frequency) telephone 303, to access a selective call information signalling system terminal (paging terminal) 305 via any public or private telephone network 304. The paging terminal 305 comprises a direct connect port 306, telephone interface 307, system processor 308, and I/0 controller 309. The direct connect port 306 is used to provide high speed, full duplex communications to the system processor 308, thus providing a user with the capability of remotely controlling the operation of the paging terminal 305.

Referring still to FIG. 3, transmitters A (310), B (311), and C (312) each include a processor (310', 311', 312') or control means that receives an information signal from the paging terminal 305 through, for example, dedicated phone lines or radio frequency links coupled to the I/0 controller 309. The I/0 controller 309 serves to multiplex the control and data channels required for the transmission of the information signal from the message origination site (paging terminal 305) to local or remote transmitter sites.

In conventional paging systems, the data rate supported by the phone line or radio frequency link must be at least equal to the data rate of the transmitted paging data. If a system operator wishes to introduce diversity in the form of multiple transmissions of a particular information signal, they must increase the bandwidth of the phone line or radio frequency link to accommodate the increased overhead (number of redundant pages sent) while maintaining the overall throughput and efficiency of the system. Increasing the data bandwidth of the link introduces more stringent constraints in both transmission technology and system cost. In considering the state of the art in present technology, modems that transmit at data rates above 1200 Baud are not very reliable when operated on a standard 3 KHz telephone line. Most paging protocols require at least 1200 Baud and preferably 2400 Baud link transmission speeds to accommodate both the selective call signalling protocol and transmitter control signalling. Higher speed data lines may be leased or a wideband radio frequency link constructed, thus permitting a higher data rate, but this is done at the expense of higher system operating costs. The solution to the problem of providing a redundant paging diversity function using a conventional link is found by packetizing (grouping) pages to be transmitted two or more times and including a control word in the packet that tells the remote transmitter sites how many times to broadcast the pages contained within the packet. In this manner, the required throughput is decreased by at least the factor of redundancy. By example, the paging data (e.g., information containing messages) that is grouped in packets is transmitted from the paging terminal (305) to at least one of the broadcast transmitters (310, 311, 312) at a rate of 1200 Baud. By example, a packet is sent having a repeat factor of three that is interpreted by the processor(s) (310', 311', 312') and selective call signalling messages are broadcast for reception by the selective call receivers in accordance with the flow diagram shown in FIG. 5.

When signalling a selective call receiver (pager) 313 using the system in FIG. 3, a user accesses the paging terminal 305 via the page entry device 301 or a conventional DTMF telephone 303. The user's input is relayed through the telephone network 304 to the paging terminal 305. The paging terminal controls access to the programming system as well as processing the user supplied data to create a message that is subsequently transmitted to a plurality of transmitting sites (310, 311, 312) that operate to transmit and re-transmit the information from at least some of the plurality of transmitting sites to the pager 313. To increase the probability of the correct and error-free reception of the information signal, diversity is used in the form of multiple broadcasts of the information signal transmitted from at least some of the plurality of transmitting sites. This diversity technique greatly decreases the probability of missing a transmission directed to any of the pagers on a given system. Upon receipt of the programming message, the pager will present the message content as determined by the paging mode selected and the information contained in the message.

Contemporary selective call receivers can benefit from the system described above because they have the ability to detect duplicate messages broadcast to their selective call address. Each selective call receiver monitors the traffic present on the information channel. The selective call receiver searches for messages directed thereto and is capable of receiving and correlating subsequent transmissions of an information signal having data representing a substantially similar message that was previously stored. When a substantially similar message is detected, the selective call receiver deletes information associated with the received information signal that was transmitted or re-transmitted from at least some of the plurality of transmitting sites so as to retain a single copy of the information signal in the form of the previously stored message.

In another embodiment, the selective call receiver may transmit an acknowledge signal indicating receipt of the transmitted or re-transmitted information signal by the transmitter 313'. This signal can be interpreted by the system to provide a positive feedback to the page originator confirming the receipt of their transmitted message. Acknowledge-back paging is well known to those skilled in the art as is shown in U.S. Pat. No. 4,825,193 issued to Siwiak et al. and assigned to Motorola, Inc.

Figure 4:
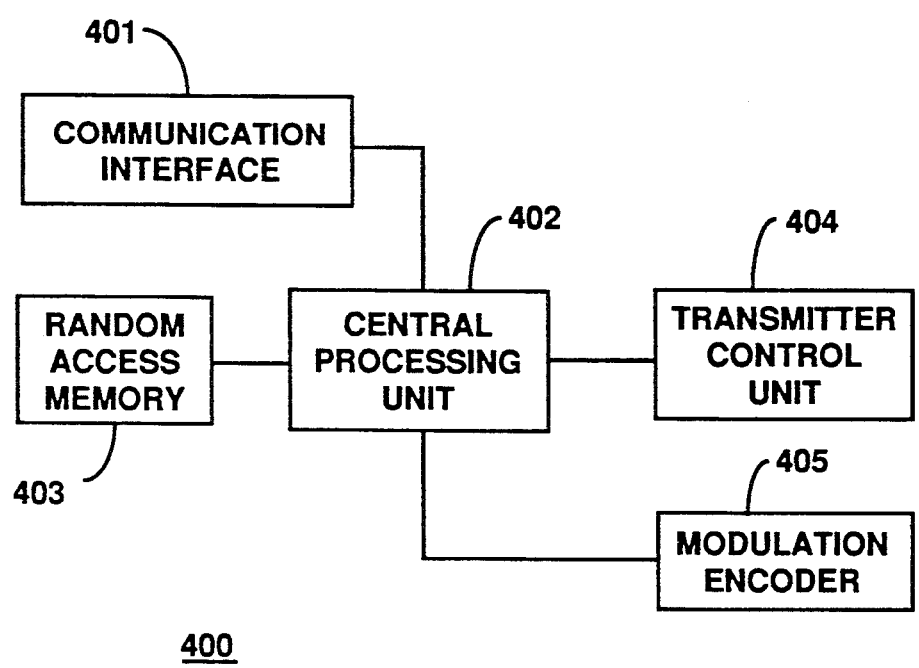
FIG. 4 is a block diagram of a processor suitable for use with the present invention.

Referring to FIG. 4, the transmitter's processor (400) comprises a communication interface (401) coupled to a central processing unit (402) such as a microprocessor, a random access memory unit (403), a transmitter control unit (TCU) (404), and a modulation encoder (405). The information signal is received from the message origination site (not shown) via a modem (not shown)

that is coupled to the central processing unit using the communication interface.

The processor (400) captures the incoming information signal from the message origination site and parses the signal into paging messages comprising a selective call address and its associated message data. The information signal also contains (if multiple page diversity is selected) a repeat count that is associated with all pages contained within the packet.

Figure 5:
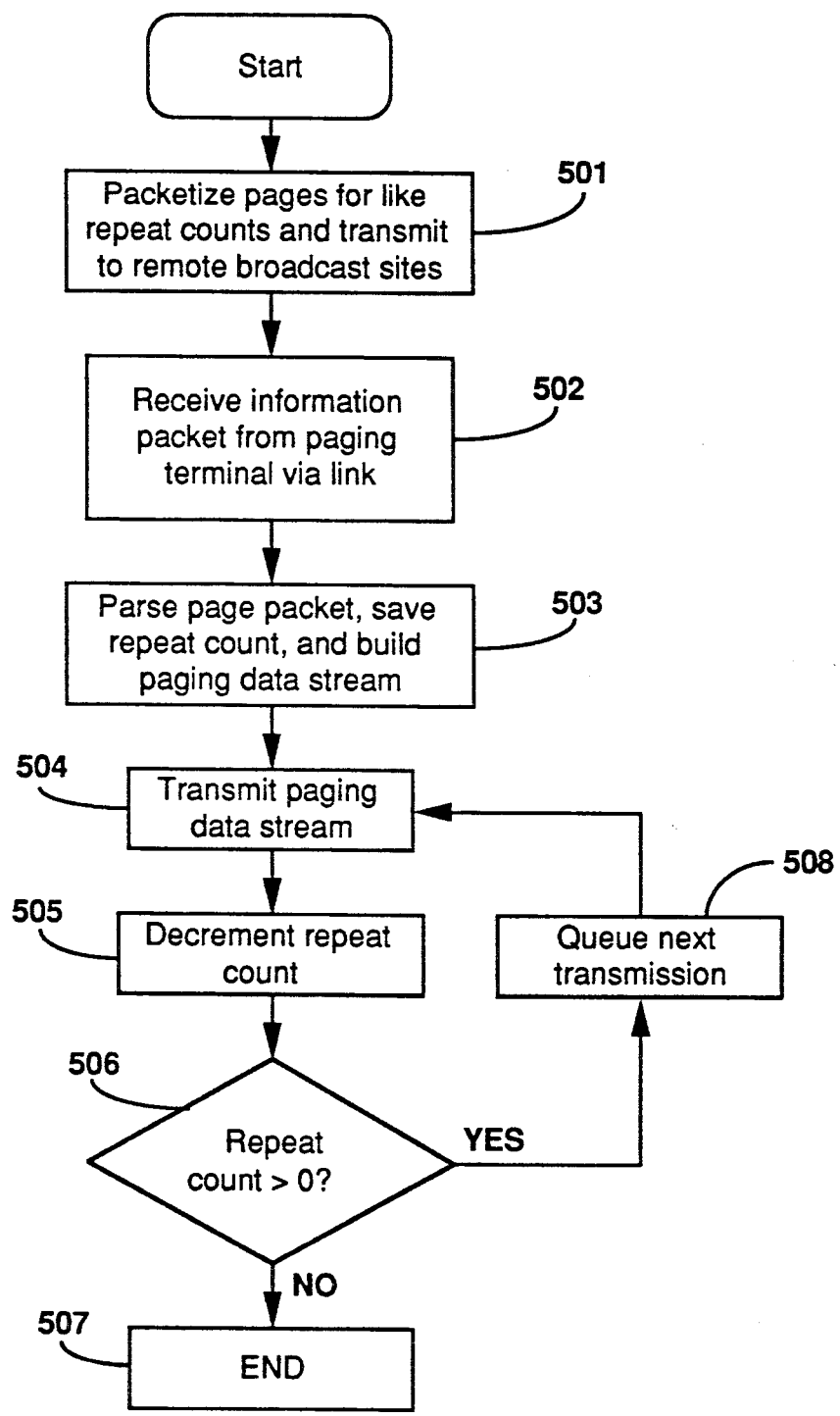
FIG. 5 a flow diagram illustrating the operation of the selective call communication system of FIG. 3.

Referring to FIG. 5, the flow diagram Shown implements an exemplary procedure that can be used to remotely generate repeated messages in accordance with the invention. In step 501 the paging terminal that has received a plurality of paging requests and generated a queue, packetizes (groups) pages with like repeat counts into an information packet and transmits the packet as an information signal (501) to at least one of a plurality of paging broadcast transmitters as shown in FIG. 3. Each transmitter's processor captures the incoming information signal from the message origination site (502) and parses the signal into paging messages and a repeat count, subsequently building a paging data stream (503). In step 503, the processor 400 (FIG. 4) commands the transmitter to broadcast the paging data stream (504). After broadcasting the paging data stream, the repeat count is decremented (or incremented in a count-up scheme) (505). Step 506 tests for completion of the repeat message transmissions. If all transmissions are complete, the procedure ends (507). If any transmissions are still pending, control is passed to step 508 where the next transmission of the packet's message contents is put in queue for transmission. The next broadcast of the paging data stream is effected when the queue scheduler commands the processor (400) to transmit (504).

What is claimed is:

1. A selective call communication method in a selective call communication system comprising a system terminal, a plurality of transmitting sites, and at least one selective call receiver, the method comprising the steps of:
   (a) transmitting an information signal comprising information and a control word from the system terminal to the plurality of transmitting sites; and
   (b) receiving the information signal from the system terminal and operating to transmit and re-transmit a number of times the information from at least some of the plurality of transmitting sites, the number of times determined in response to the control word.

2. The method of claim 1, which includes the step of (c) receiving, by one of the at least one selective call receiver, the information transmitted from one of the at least some of the plurality of transmitting sites.

3. The method of claim 1, which includes the step of (c) receiving, by one of the at least one selective call receiver, the information re-transmitted from one of the at least some of the plurality of transmitting sites.

4. The method of claim 1, which includes the step of (c) receiving, by one of the at least one selective call receiver, the information transmitted and re-transmitted from one of the at least some of the plurality of transmitting sites.

5. The method of claim 4, which includes the step of (d) deleting, by one of the at least one selective call receiver, the information re-transmitted from one of the at least some of the plurality of transmitting sites and received by the one of the at least one selective call receiver so as to retain a single copy of the information.

6. The method of claim 1, which includes the step of (e) transmitting, from one of the at least one selective call receiver, an acknowledge signal indicating receipt of the transmitted or re-transmitted information signal.

7. A selective call communication method in a selective call communication system comprising a message origination site, a plurality of transmitting sites, and at least one selective call receiver, the method comprising the steps of:
   (a) singularly transmitting an information signal comprising information and a control word from the message origination site to the plurality of transmitting sites;
   (b) receiving the information signal from the message origination site and transmitting the information from at least some of the plurality of transmitting sites; and
   (c) re-transmitting the information a number of times from the at least some of the plurality of transmitting sites, the number of times determined in response to the control word.

8. The method of claim 7, which includes the step of (d) receiving, by one of the at least one selective call receiver, the information transmitted from one of the at least some of the plurality of transmitting sites.

9. The method of claim 7, which includes the step of (d) receiving, by one of the at least one selective call receiver, the information re-transmitted from one of the at least some of the plurality of transmitting sites.

10. The method of claim 7, which includes the step of (d) receiving, by one of the at least one selective call receiver, the information transmitted and re-transmitted from one of the at least some of the plurality of transmitting sites.

11. The method of claim 10, which includes the step of (e) deleting, by one of the at least one selective call receiver, the information re-transmitted from one of the at least some of the plurality of transmitting sites and received by the one of the at least one selective call receiver so as to retain a single copy of the information.

12. The method of claim 7, which includes the step of (d) transmitting, from one of the at least one selective call receiver, an acknowledge signal indicating receipt of the transmitted or re-transmitted information signal.

13. A selective call communication system, comprising:
   a message origination site for receiving messages and for transmitting an information signal comprising said messages and control words therefrom; and
   a plurality of transmitting sites, at least some of the plurality of transmitting sites comprising:
   receiving means for receiving the information signal from the message origination site;
   transmitting means for transmitting and re-transmitting a signal comprising the messages to at least one receiver; and
   control means coupled to said receiving means and said transmitting means for controlling the transmitting means to re-transmit the signal a number of times, the number of times determined in response to the control words.

14. A selective call communication system, comprising:
   system terminal means for encoding and transmitting an information signal therefrom; and
   a plurality of transmitting sites, wherein at least some of the plurality of transmitting sites comprises:

means for receiving the information signal from the message origination site;

means for transmitting the information signal therefrom; and control means, coupled to the transmitting means, for repeating the transmission of the information signal a number of times, the number of times determined in response to the information signal.

15. A selective call communication system, comprising:

a message origination site for encoding information onto an information signal and for singularly transmitting the information signal therefrom; and a plurality of transmitting sites coupled to the message origination site for receiving the singular transmission of the information signal, wherein at least some of the plurality of transmitting sties are constructed and arranged to include means for repeatedly transmitting the information a number of times therefrom, the number of items determined in response to the information signal.

* * * * *